(12) United States Patent
Unes et al.

(10) Patent No.: US 11,954,712 B2
(45) Date of Patent: *Apr. 9, 2024

(54) REVIEW AND TICKET MANAGEMENT SYSTEM AND METHOD

(71) Applicant: Karya Property Management, LLC, Houston, TX (US)

(72) Inventors: Ali Unes, Houston, TX (US); Alper Özhan, Houston, TX (US)

(73) Assignee: Karya Property Management, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,957

(22) Filed: Feb. 13, 2023

(65) Prior Publication Data

US 2023/0196419 A1 Jun. 22, 2023

Related U.S. Application Data

(63) Continuation of application No. 16/908,396, filed on Jun. 22, 2020, now Pat. No. 11,580,580.

(51) Int. Cl.
*G06Q 30/02* (2023.01)
*G06F 9/54* (2006.01)
(Continued)

(52) U.S. Cl.
CPC ... *G06Q 30/0282* (2013.01); *G06Q 10/06316* (2013.01); *G06Q 10/1097* (2013.01);
(Continued)

(58) Field of Classification Search
CPC ......... G06Q 30/0282; G06Q 10/06316; G06Q 10/1097; G06Q 10/20; G06Q 50/163; G06F 9/548
See application file for complete search history.

(56) References Cited

U.S. PATENT DOCUMENTS 7,949,121 B1 * 5/2011 Flockhart ............ H04M 3/5141
370/352
9,298,836 B1 3/2016 Lerman et al.
(Continued)

FOREIGN PATENT DOCUMENTS

CA 2761560 3/2012
CA 2761560 A1 * 3/2012 ......... G06Q 30/0631
(Continued)

OTHER PUBLICATIONS

Jonathan Herzig, "Predicting Customer Satisfaction in Customer Support Conversations in Social Media Using Affective Features", 2016, ACM, ISBN, pp. 115-119. (Year: 2016).*
(Continued)

*Primary Examiner* — Tan D Nguyen
(74) *Attorney, Agent, or Firm* — Baker Botts L.L.P.

(57) ABSTRACT

The present disclosure provides for an apparatus for accessing a management system comprising a memory operable to store a plurality of customer reviews received from a plurality of external sources and a processor operably coupled to the memory. The processor is configured to receive the plurality of customer reviews, wherein receiving the plurality of customer reviews comprises of transmitting a functional call at a pre-determined frequency with property identifiers to an application programming interface (API). The processor is further configured to categorize each of the received plurality of customer reviews into a designated category and to generate a response to one of the received plurality of customer reviews. The processor is further configured to transmit the generated response to one of the plurality of external sources and to display each of the received plurality of customer reviews through one or more widgets on a user interface of the management system.

18 Claims, 3 Drawing Sheets

(51) Int. Cl.
*G06Q 10/00* (2023.01)
*G06Q 10/06* (2023.01)
*G06Q 10/0631* (2023.01)
*G06Q 10/10* (2023.01)
*G06Q 10/1093* (2023.01)
*G06Q 10/20* (2023.01)
*G06Q 30/0282* (2023.01)
*G06Q 50/16* (2012.01)
*G06Q 50/163* (2024.01)

(52) U.S. Cl.
CPC ........... *G06Q 10/20* (2013.01); *G06Q 50/163* (2013.01); *G06F 9/548* (2013.01)

(56) References Cited

U.S. PATENT DOCUMENTS

| | | | |
|---|---|---|---|
| 2015/0046206 A1* | 2/2015 | Kelley | G06Q 30/04 705/7.13 |
| 2015/0100439 A1 | 4/2015 | Lu et al. | |
| 2015/0120648 A1* | 4/2015 | Slovacek | G06F 16/41 707/609 |
| 2015/0195295 A1* | 7/2015 | Sandler | G06F 16/951 726/26 |
| 2015/0262119 A1* | 9/2015 | Santo, Jr. | G06Q 10/06 705/28 |
| 2015/0297779 A1* | 10/2015 | Conroy | B05B 7/2416 239/74 |
| 2017/0011126 A1 | 1/2017 | Lerman et al. | |
| 2017/0301039 A1 | 10/2017 | Dyer et al. | |
| 2021/0150546 A1* | 5/2021 | Zhu | G06Q 30/0282 |

FOREIGN PATENT DOCUMENTS

| | | | |
|---|---|---|---|
| CN | 105931094 A | 9/2016 | |
| CN | 106056349 A | 10/2016 | |
| CN | 107203610 A | 9/2017 | |
| WO | WO-2015113002 A2 * | 7/2015 | ............ G06Q 30/02 |
| WO | WO2015113002 A2 | 7/2015 | |
| WO | WO2016178228 A1 | 11/2016 | |
| WO | WO-2018104834 A1 * | 6/2018 | ............ G06F 1/163 |
| WO | WO2021042077 A1 | 3/2021 | |

OTHER PUBLICATIONS

Vishal Gupta, "A Survey of Text Mining Techniques and Applications," Aug. 2009, Journal of Emerging Technologies in Web Intelligence, vol. 1, No. 1, pp. 60-76. (Year: 2009).*

Mollie M. Swann, "Tip Reporting In Independent Food and Beverage Establishments," 2013, Journal of Hospitality Financial Management, vol. 20, Issue 2, pp. 1-22. (Year: 2013).*

Michael Svangren, "Investigating the Use of an Online Peer-to-Peer Car Sharing Service", Aug. 2019, IFIP Conference on Human Computer Interaction, pp. 1-58. (Year: 2019).

A. Nicolaides, "Service Quality Provision . . . Gauteng Casino Complex", 2012, African Journal of Hospitality, Tourism and Leisure vol. 2 (2), pp. 1-21. (Year: 2012).

S.C. Hui, "Data Mining for Customer Service Support", Nov. 1999, Information and Management 38 (2000), pp. 1-13. (Year: 2000).

* cited by examiner

REVIEW AND TICKET MANAGEMENT SYSTEM AND METHOD

CROSS-REFERENCE TO RELATED APPLICATION

This application is a continuation of U.S. patent application Ser. No. 16/908,396, filed on Jun. 22, 2020 entitled "Customer Review and Ticket Management System", the entire contents of which are hereby incorporated by reference.

TECHNICAL FIELD

Embodiments of the present disclosure relate to a management system, more particularly, to systems and methods for use in a consolidated platform to manage customer reviews and tickets.

BACKGROUND

Customers publish reviews of their experiences across a plurality of separate websites and platforms. It is inefficient to access each separate website or platform to address these reviews.

BRIEF DESCRIPTION OF THE DRAWINGS

For a more complete understanding of the present disclosure and its features and advantages, reference is now made to the following description, taken in conjunction with the accompanying drawings, in which.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure provides for systems and methods for managing customer reviews, emails, work orders, and any combination thereof of various properties. In embodiments, a given entity may own, operate, and/or manage a plurality of various properties in different locations. There may be specific websites and/or systems designated to each property. The disclosed management system may be an improvement upon existing technologies by providing a centralized system that is compatible with each of the individual websites and/or systems. In embodiments, the management system may be further configured to allow an operator to communicate with clients across a multitude of separate platforms.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

Figure 1A:
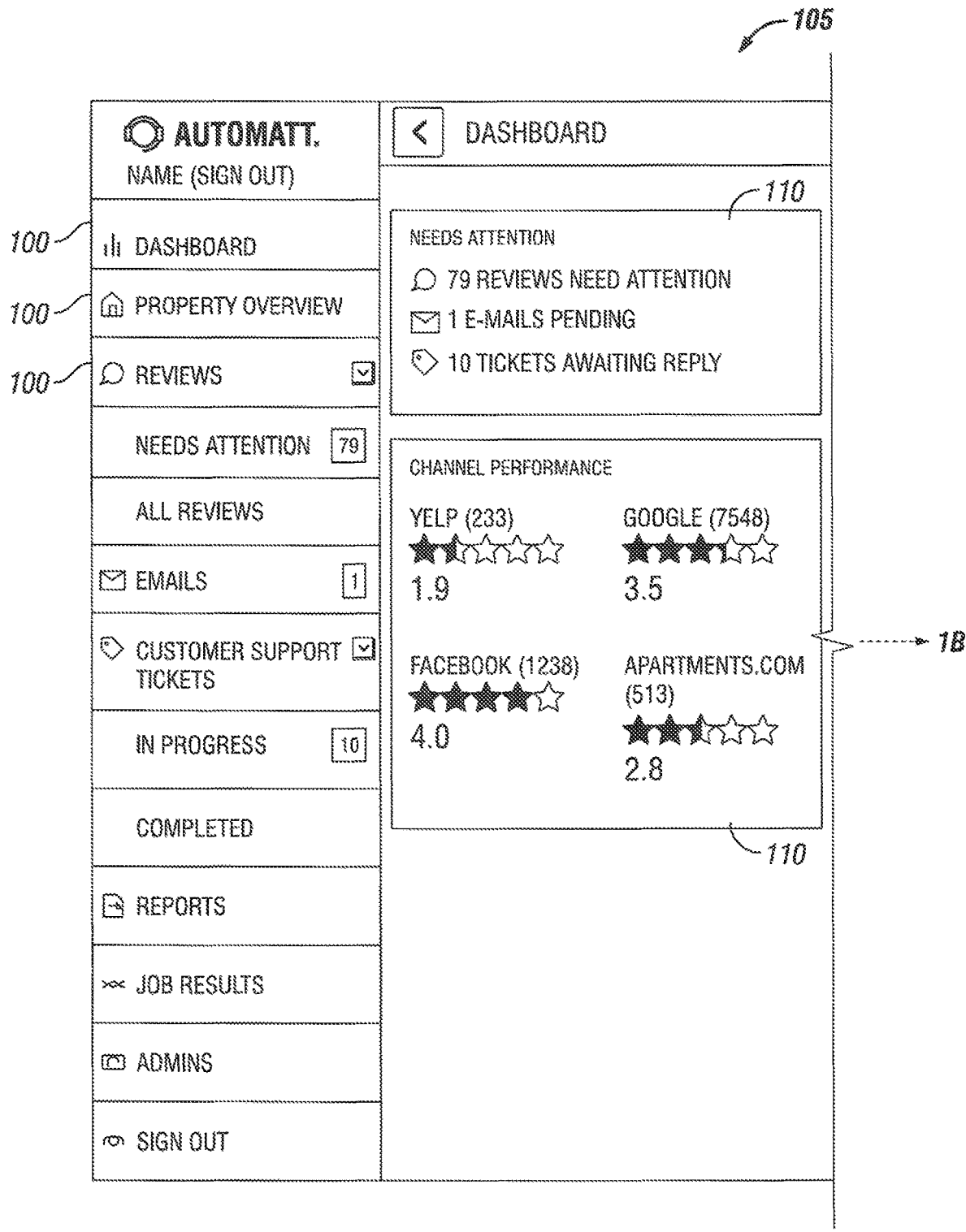
FIG. 1A illustrates an embodiment of a management system, in accordance with an embodiment of the present disclosure.
Figure 1B:
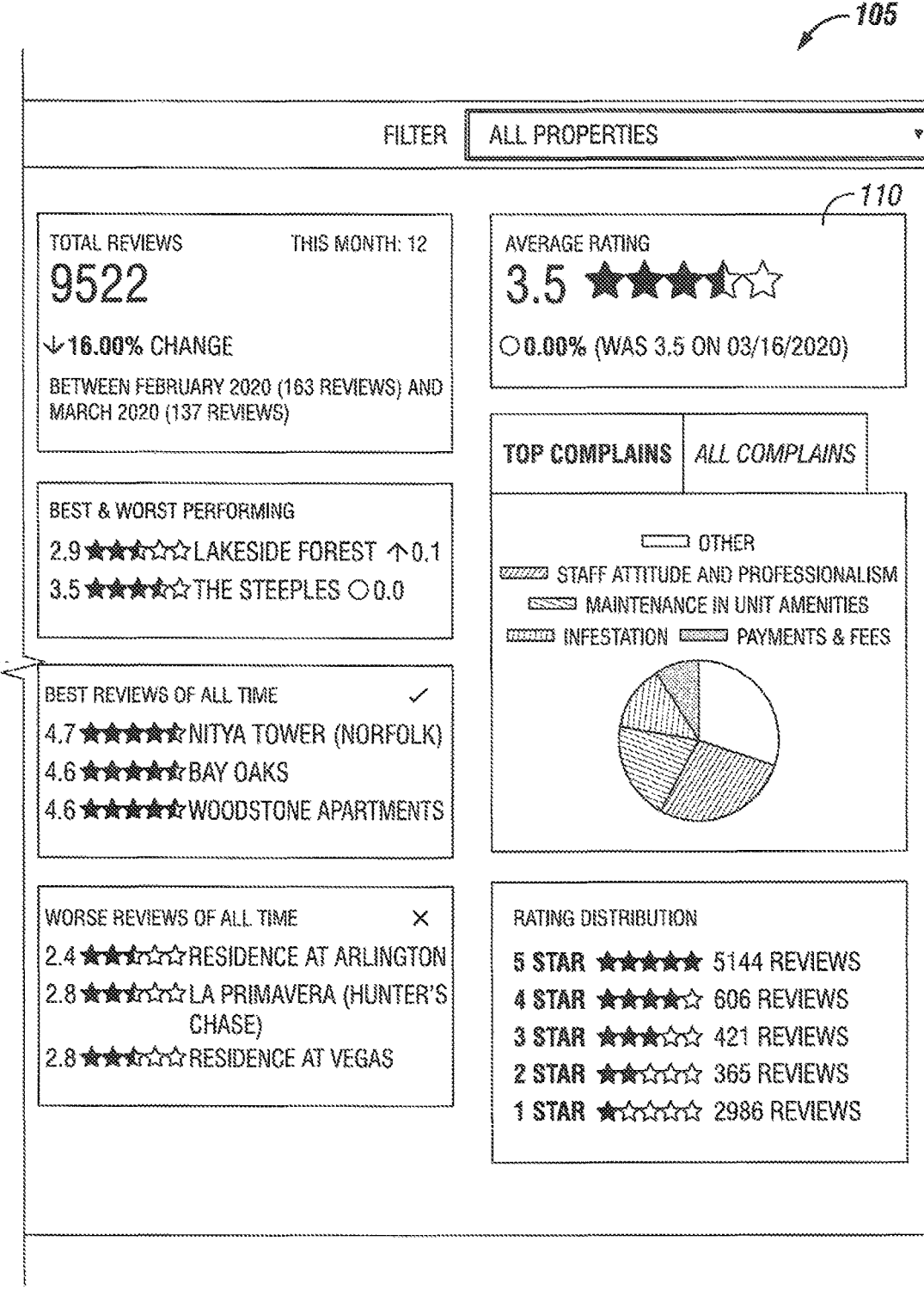
FIG. 1B illustrates an embodiment of a management system, in accordance with an embodiment of the present disclosure.

FIGS. 1A and 1B illustrate an embodiment of a user interface 100 of a management system 105. Without limitations, the management system 105 may be configured to manage customer reviews and/or work orders. In one or more embodiments, the management system 105 may import customer reviews from a plurality of external sources, categorize the customer reviews, reply to the customer reviews based on what category into which they have been assigned, and any combination thereof. In other embodiments, the management system 105 may manage work orders submitted by customers through the assignment of tickets, create a ticket from a received email, monitor the progress of each ticket, and any combination thereof. In further embodiments, the management system 105 may generate and distribute summary reports based on the information collected and modified by the management system 105.

As illustrated in FIGS. 1A and 1B, after an operator of the management system 105 has signed into the management system 105, the user interface 100 that may initially be displayed is the dashboard. With regards to the present disclosure, the dashboard may be a graphical user interface (GUI) that provides a summary of key performance indicators relevant to a particular objective or business process (for example, monitoring property performance). In embodiments, the dashboard may display information collected from all available properties by default. In certain embodiments, an operator may filter between specific properties listed on the management system 105, or subsets of properties, and display information specific to a singular property or display information as an overview to all properties. In one or more embodiments, the management system 105 may comprise a plurality of user interfaces 100. In embodiments, each one of the plurality of user interfaces 100 may be configured to filter between all properties, subsets of properties, or specific properties. In embodiments, each of the plurality of user interfaces 100 may comprise one or more widgets 110, wherein the one or more widgets 110 may be software applications or components made for one or more different software platforms. Without limitations, the one or more widgets 110 may be graphical control elements, mobile widgets, web widgets, and any combination thereof.

In one or more embodiments, the management system 105 may import customer reviews from a plurality of various external sources. In embodiments, the management system 105 may be communicatively coupled to the plurality of various external sources. Without limitations, the management system 105 may import customer reviews from Google, Facebook, Yelp, Apartments.com, and the like. In certain embodiments, the management system 105 may utilize the external source's application programming interface (API). For example, the management system 105 may import customer reviews from Google via Google's API and from Facebook via Facebook's API. As used herein, an API is a computing interface to a software component or a system that defines how other components or systems may use it. The API may define the kinds of calls or requests that can be made, how to make them, the data formats that should be used, the conventions to follow, and the like.

In other embodiments, the management system 105 may retrieve customer reviews by web scraping the customer reviews directly from the source. For example, the management system 105 may web scrape the customer reviews from Yelp and Apartments.com manually, automatically, or a combination thereof. In embodiments, the management system 105 may be configured to perform these importation functions for the customer reviews at a pre-determined frequency. The pre-determined frequency may be from about once every hour to once every day. Without limitations, the importing functions may be performed once every 6 hours, once every 12 hours, or once every 24 hours. One of ordinary skill in the art will recognize that the management system 105 is not limited to these frequencies, and the pre-determined frequency may be faster or slower. In embodiments, there may be a scheduled job working in a server stored on the cloud that may retrieve customer reviews and write them to an internal database present in the management system 105. The scheduled job may make a functional call with property identifiers to an individual importer (for example, an API). In embodiments, the scheduled job may not require user input or produce an output. During operations, the individual importer may create a list of uniform resource locators (URLs) to download with the property identifier. For each URL, the individual importer may make a "GET" request for the webpage and retrieve the results as a hypertext markup language (HTML) document. A third-party HTML parser may be employed to parse through the document and extract the review information to create a record in the internal database for the management system 105.

In embodiments, each customer review obtained from the plurality of external sources and utilized by the management system 105 may adhere to a similar rating system. Without limitations, and for example, the rating system common to Google, Facebook, Yelp, and Apartments.com may be a numerical range from 1-5, wherein 5 is the most positive rating and 1 is the most negative rating. In embodiments wherein the external source utilizes a rating system wherein 1 is indicative of the most positive and 5 the most negative, the management system 105 may invert the values of the imported reviews from that particular external source to maintain similarity to the rating system used by the other remaining external sources. In one or more embodiments, the rating system used by the management system 105 may be visually represented within the one or more widgets 110 as the number of highlighted stars in proportion to the number of available stars. In these embodiments, a "star" shape is used, as illustrated, but any suitable shape or graphic may be used to depict the rating provided in the customer review. For example, if a customer review contains a rating scored as a "4", then four out of five available stars may be depicted as highlighted or shaded-in within the management system 105. While each customer review may comprise a rating with a numerical value, the customer review may further comprise text.

In further embodiments, the management system 105 may categorize the imported customer reviews based on the subject matter present in the text of each review. If there is no text in an imported customer review, then that review may not be categorized. In alternative embodiments, there may be a designated category for customer reviews that do not comprise text. In embodiments, an operator of the management system 105 may manually parse through the text of each imported customer review and designate one or more categories where that specific review will be assigned. Assigning the one or more categories may be based on there being specific key words and/or phrases present in the text of the review. In one or more embodiments, the categorization function of the management system 105 may be automated, wherein the management system 105 may be configured to automatically parse through the text and designate one or more categories for assignment of the customer review. For example, there may be a statement in the review conveying that the customer had problems with the shower not working. The operator may select a category designated as "maintenance" or the like. In other embodiments, the management system 105 may categorize the customer review by parsing through it to search for specific words that are internally designated to categories. In embodiments, any key words and/or phrases may be suitable for use in the management system 105. Without limitations, the categories where each imported customer review will be assigned may be "staff", "maintenance", "payment & fees", "trash", "pool", "neighbors", "security", "parking", "pets", and the like.

In one or more embodiments, once the management system 105 has imported all of the available customer reviews in a given interval and categorized them, the processed customer reviews may be displayed on the dashboard and/or on other user interfaces 100. As illustrated in FIGS. 1A and 1B, the dashboard may provide various overall statistics while other user interfaces 100 may display the processed customer reviews in more detailed description. In embodiments, one of the one or more widgets 110 of the dashboard may display the total number of imported customer reviews. In this embodiment, the one of the one or more widgets 110 may additionally display the number of imported customer reviews for the previous month, the number of imported customer reviews for the current month, and the percentage difference between the two. For example, and as illustrated, the dashboard may display through the one of the one or more widgets 110 that the management system 105 has processed 9522 customer reviews in total, 163 customer reviews for the month of February 2020, 137 customer reviews for the month of March 2020, and that there is a 16% decrease in the amount of customer reviews processed between those months.

In further embodiments, a separate one of the one or more widgets 110 of the dashboard may display the current average rating. In one or more embodiments, after the management system 105 has imported all of the available customer reviews in a given interval, the management system 105 may calculate the average rating from all processed customer reviews. In this embodiment, the separate one of the one or more widgets 110 may additionally display the average rating for the previous month and the percentage difference between the two. For example, and as illustrated, the dashboard may display through the separate one of the one or more widgets 110 that the management system 105 has calculated a current average rating of 3.5, the average rating for the previous month was 3.5, and that there is a 0% change between those ratings.

In further embodiments, a separate one of the one or more widgets 110 of the dashboard may display the current distribution of ratings from the imported customer reviews. In one or more embodiments, after the management system 105 has imported all of the available customer reviews in a given interval, the management system 105 may display the total number of customer reviews providing a specific rating. For example, and as illustrated, the dashboard may display through the separate one of the one or more widgets 110 that the management system 105 has processed 5144 customer reviews that have scored a rating of 5 on the rating system, 606 customer reviews that have scored a rating of 4 on the rating system, etc. In these embodiments, the separate one of the one or more widgets 110 may not categorize the results by a particular property, but the displayed information may be the general distribution of ratings.

In further embodiments, a separate one of the one or more widgets 110 of the dashboard may display the average rating provided by each external source. In one or more embodiments, after the management system 105 has imported all of the available customer reviews in a given interval, the management system 105 may further display the total number of customer reviews provided by each external source. For example, and as illustrated, the dashboard may display through the separate one of the one or more widgets 110 that the customer reviews provided by Google have an average rating of 3.5, that Google has provided 7548 customer reviews, the customer reviews provided by Facebook have an average rating of 4, that Facebook has provided 1238 customer reviews, the customer reviews provided by Yelp have an average rating of 1.9, that Yelp has provided 223 customer reviews, the customer reviews provided by Apartments.com have an average rating of 2.8, and that Apartments.com has provided 513 customer reviews.

In further embodiments, a separate one of the one or more widgets 110 of the dashboard may display the best rated properties from the imported customer reviews, wherein best rated is defined herein as the total average ratings closest to a rating of 5. In one or more embodiments, after the management system 105 has imported all of the available customer reviews in a given interval and calculated respective averages, the management system 105 may display the properties in a descending order. For example, and as illustrated, the dashboard may display through the separate one of the one or more widgets 110 that the best rated properties are "Nitya Tower (Norfolk)" with an average total rating of 4.7, "Bay Oaks" with an average total rating of 4.6, and "Woodstone Apartments" with an average total rating of 4.6. While three properties are herein displayed, the management system 105 is not limited to displaying three properties. In one or more embodiments, more or less than three properties may be displayed as the best rated properties.

In further embodiments, a separate one of the one or more widgets 110 of the dashboard may display the worst rated properties from the imported customer reviews, wherein worst rated is defined herein as the total average ratings closest to a rating of 1. In one or more embodiments, after the management system 105 has imported all of the available customer reviews in a given interval and calculated respective averages, the management system 105 may display the properties in an ascending order. For example, and as illustrated, the dashboard may display through the separate one of the one or more widgets 110 that the worst rated properties are "Residence at Arlington" with an average total rating of 2.4, "La Primavera (Hunter's Chase)" with an average total rating of 2.8, and "Residence at Vegas" with an average total rating of 2.8. As previously disclosed, the management system 105 is not limited to displaying three properties; more or less than three properties may be displayed as the worst rated properties.

In further embodiments, a separate one of the one or more widgets 110 of the dashboard may display the best and worst performing properties. With regards to the present disclosure, best performing is defined as the property with the greatest increase in average rating, and worst performing is defined as the property with the greatest decrease in average rating. In this embodiment, the separate one of the one or more widgets 110 may additionally display the current average rating and the numerical difference and/or percentage difference between the current average rating and that of the previous month. For example, and as illustrated, the dashboard may display through the one of the one or more widgets 110 that "Lakeside Forest" has a current average rating of 2.9, that the current average rating of "Lakeside Forest" has increased by 0.1 since the previous month, that "The Steeples" has a current average rating of 3.5, and that the current average rating of "The Steeples" has not changed since the previous month. In the present embodiment, "Lakeside Forest" may be designated as the best performing property, and "The Steeples" may be designated as the worst performing property.

In further embodiments, after the management system 105 has imported all of the available customer reviews in a given interval, a separate one of the one or more widgets 110 of the dashboard may display the most frequent complaints by category provided by the customer reviews. In one or more embodiments, the management system 105 may further display every complaint by category. In these embodiments, the separate one of the one or more widgets 110 may display the categories visually through any suitable graph and/or numerically by columns. For example, and as illustrated, the dashboard may display through the separate one of the one or more widgets 110 a pie chart divided into five separate portions, wherein each portion is representative by percentage of the amount of customer reviews imported that have been assigned to a particular category. For example, the largest portion of the pie chart is designated as the "Staff Attitude and Professionalism" category, so for the imported customer reviews that have been processed, more of those reviews have been categorized into that category than any other category. While five categories are herein displayed, the management system 105 is not limited to displaying five categories. In one or more embodiments, more or less than five categories may be displayed as the most frequent complaints by category.

In further embodiments, a separate one of the one or more widgets 110 of the dashboard may display actionable functions. In one or more embodiments, the actionable functions may be hyperlinked to another user interface 100 wherein an operator may perform certain tasks. Without limitations, the actionable functions may be pending emails, pending tickets, pending review replies, and any combination thereof. Without limitations, the certain tasks that an operator may perform regarding the actionable functions may be reviewing and/or responding to an email, reviewing and/or updating a ticket, reviewing and/or preparing a reply to a review, and any combination thereof. In this embodiment, the separate one of the one or more widgets 110 may display the number of addressable objects within each actionable function. For example, and as illustrated, the dashboard may display through the one of the one or more widgets 110 that 79 reviews need attention (for example, to be replied to), there is 1 new email to be reviewed and responded to, and there are 10 tickets to be reviewed and/or updated.

Figure 2:
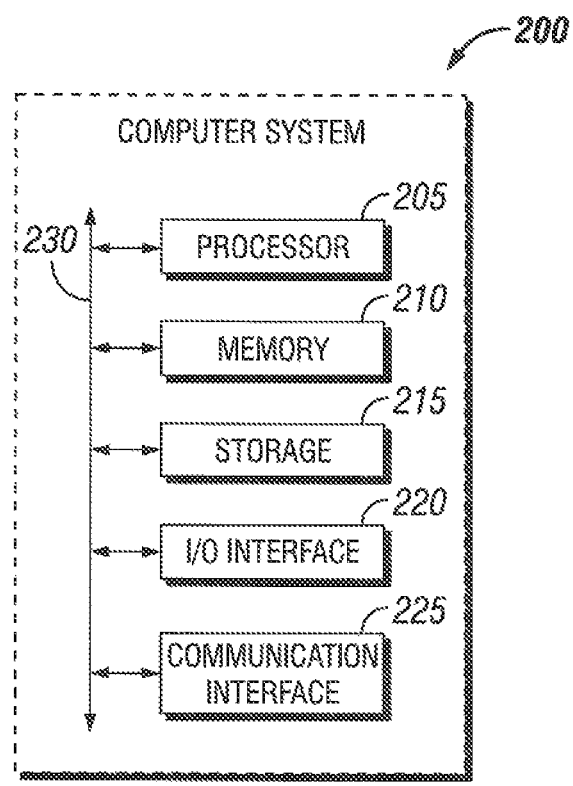
FIG. 2 illustrates a computer system, in accordance with an embodiment of the present disclosure.

With regards to the present disclosure, the management system 105 may be accessed and/or modified by a computer system. FIG. 2 illustrates an example computer system 200. In embodiments, one or more computer systems 200 may perform one or more steps of one or more methods described or illustrated herein. In particular embodiments, software running on one or more computer systems 200 may perform one or more steps of one or more methods described or illustrated herein or may provide functionality described herein. Herein, reference to a computer system may encompass a computing device, and vice versa, where appropriate. Moreover, reference to a computer system may encompass one or more computer systems, where appropriate.

With regards to the present disclosure, computer system 200 may comprise any suitable physical form. For example and without limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, and/or any combinations thereof. Where appropriate, computer system 200 may include one or more computer systems 200; be unitary or distributed; span multiple locations; span multiple machines; span multiple data centers; and/or reside in a cloud, which may include one or more cloud components in one or more networks. Where appropriate, one or more computer systems 200 may perform, without substantial spatial or temporal limitation, one or more steps of one or more methods described or illustrated herein. For example and without limitation, one or more computer systems 200 may perform in real time or in batch mode one or more steps of one or more methods described or illustrated herein. One or more computer systems 200 may perform at different times and/or at different locations one or more steps of one or more methods described or illustrated herein, where appropriate.

In embodiments, computer system 200 may comprise a processor 205, memory 210, storage 215, an input/output (I/O) interface 220, a communication interface 225, and a bus 230. Processor 205 may include hardware for executing instructions, such as those making up a computer program. For example and without limitation, to execute instructions, processor 205 may retrieve the instructions from an internal register, an internal cache, memory 210, and/or storage 215; decode and execute them; and then write one or more results to an internal register, an internal cache, memory 210, and/or storage 215. In embodiments, processor 205 may include one or more internal caches for data, instructions, or addresses. Without limitations, processor 205 may include any suitable number of internal caches. For example, processor 205 may include one or more instruction caches, one or more data caches, and/or one or more translation lookaside buffers (TLBs). Instructions in the instruction caches may be copies of instructions in memory 210 or storage 215, and the instruction caches may speed up retrieval of those instructions by processor 205. Data in the data caches may be copies of data in memory 210 or storage 215 for instructions executing at processor 205 to operate on; the results of previous instructions executed at processor 205 for access by subsequent instructions executing at processor 205 or for writing to memory 210 or storage 215; or other suitable data. The data caches may speed up read or write operations by processor 205. The TLBs may speed up virtual-address translation for processor 205. In embodiments, processor 205 may include one or more internal registers for data, instructions, or addresses. Without limitations, processor 205 may include any suitable number of internal registers. Without limitations, processor 205 may include one or more arithmetic logic units (ALUs); be a multi-core processor; or include one or more processors 205. Although this disclosure describes and illustrates a particular processor, any suitable processor may be operable in computer system 200.

In embodiments, memory 210 may include main memory for storing instructions for processor 205 to execute or data for processor 205 to operate on. For example, computer system 200 may load instructions from storage 215 or another source (such as, for example, another computer system 200) to memory 210. Processor 205 may then load the instructions from memory 210 to an internal register or internal cache. To execute the instructions, processor 205 may retrieve the instructions from the internal register or internal cache and decode them. During or after execution of the instructions, processor 205 may write one or more results (which may be intermediate or final results) to the internal register or internal cache. Processor 205 may then write one or more of those results to memory 210. In embodiments, processor 205 may only execute instructions in one or more internal registers or internal caches or in memory 210 (as opposed to storage 215 or elsewhere) and only operate on data in one or more internal registers or internal caches or in memory 210 (as opposed to storage 215 or elsewhere). One or more memory buses (which may each include an address bus and a data bus) may couple processor 205 to memory 210. Bus 230 may include one or more memory buses, as described below. In embodiments, one or more memory management units (MMUs) may reside between processor 205 and memory 210 and may facilitate access to memory 210 requested by processor 205. In embodiments, memory 210 may include random access memory (RAM). This RAM may be volatile memory. Where appropriate, this RAM may be dynamic RAM (DRAM) or static RAM (SRAM). Moreover, this RAM may be single-ported or multi-ported RAM. In embodiments, there may be one or more memories 210. Although this disclosure describes and illustrates particular memory, any suitable memory may be operable in computer system 200.

In embodiments, storage 215 may include mass storage for data or instructions. Without limitations, storage 215 may include a hard disk drive (HDD), a floppy disk drive, flash memory, an optical disc, a magneto-optical disc, magnetic tape, a Universal Serial Bus (USB) drive, and/or combinations thereof. Storage 215 may include removable or non-removable media. Storage 215 may be internal or external to computer system 200, where appropriate. In embodiments, storage 215 is non-volatile, solid-state memory. In certain embodiments, storage 215 may include read-only memory (ROM). Without limitations, this ROM may be mask-programmed ROM, programmable ROM (PROM), erasable PROM (EPROM), electrically erasable PROM (EEPROM), electrically alterable ROM (EAROM), flash memory, and/or combinations thereof. Mass storage 215 may take any suitable physical form. Storage 215 may include one or more storage control units facilitating communication between processor 205 and storage 215. There may be one or more storages 215. Although this disclosure describes and illustrates particular storage, any suitable storage may be operable in computer system 200.

In embodiments, I/O interface 220 may include hardware, software, or both, providing one or more interfaces for communication between computer system 200 and one or more I/O devices. Computer system 200 may include one or more of these I/O devices, where appropriate. One or more of these I/O devices may enable communication between an operator and computer system 200. Without limitations, an I/O device may include a keyboard, keypad, microphone, monitor, mouse, printer, scanner, speaker, still camera, stylus, tablet, touch screen, trackball, video camera, another suitable I/O device, and/or combinations thereof. An I/O device may include one or more sensors. Where appropriate, I/O interface 220 may include one or more device or software drivers enabling processor 205 to drive one or more of these I/O devices. Although this disclosure describes and illustrates a particular I/O interface, any suitable I/O interface may be operable in computer system 200.

In embodiments, communication interface 225 may include hardware, software, or both providing one or more interfaces for communication (such as, for example, packet-based communication) between computer system 200 and one or more other computer systems 200 or one or more networks. Without limitations, communication interface 225 may include a network interface controller (NIC) or network adapter for communicating with an Ethernet or other wire-based network or a wireless NIC (WNIC) or wireless adapter for communicating with a wireless network, such as a WI-FI network. Any suitable network and any suitable communication interface 225 may be used regarding the present disclosure. Without limitations, computer system 200 may communicate with an ad hoc network, a personal area network (PAN), a local area network (LAN), a wide area network (WAN), a metropolitan area network (MAN), one or more portions of the Internet, and/or combinations thereof. In embodiments, one or more portions of one or more of these networks may be wired or wireless. Without limitations, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), other suitable wireless network, and/or combinations thereof. Computer system 200 may include any suitable communication interface 225 for any of these networks, where appropriate. There may be one or more communication interfaces 225. Although this disclosure describes and illustrates a particular communication interface, any suitable communication interface may be operable in computer system 200.

In embodiments, bus 230 may include hardware, software, or both for coupling components of computer system 200 to each other. There may be one or more buses 230, where appropriate. Although this disclosure describes and illustrates a particular bus, any suitable bus may be used in computer system 200.

Herein, a computer-readable non-transitory storage medium or media may include one or more semiconductor-based or other integrated circuits (ICs), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, and/or combinations thereof. A computer-readable non-transitory storage medium may be volatile, non-volatile, or a combination of volatile and non-volatile, where appropriate.

With reference to both FIGS. 1-2, in one or more embodiments, an operator may display further data based on the imported customer reviews by selecting one of the plurality of user interfaces 100 different from the dashboard through the use of the computer system 200. In embodiments, a separate one of the plurality of user interfaces 100 may display the overview of statistics for a list of all available properties. In this embodiment, there may be a compilation of all the available properties that have been rated based on the imported customer reviews. Without limitations, for a given property, the average of the current month's imported customer reviews may be calculated and displayed, the average of the previous month's imported customer reviews may be calculated and displayed, the numerical difference and/or percentage difference between the two may be calculated and displayed, the sum total of imported customer reviews may be calculated and displayed, and the average of the imported customer reviews and numerical difference and/or percentage difference between the current month and previous month may be calculated and displayed per external source. In embodiments, these values and information may be displayed in a convenient format (for example, a sortable table). As previously disclosed, the user interface 100 may be configured to filter between all properties available to the operator, subsets of properties, specific properties, and any combination thereof.

In one or more embodiments, an operator may display further data based on the imported customer reviews by selecting one of the plurality of user interfaces 100 different from the dashboard through the use of the computer system 200. In embodiments, a separate one of the plurality of user interfaces 100 may display an overview of statistics for all imported and processed customer reviews and those that require action from an operator. In this embodiment, the difference between displaying the statistics for all imported and processed customer reviews and those that require action from an operator may be the implementation of a filter for the ones that require action.

For example, and without limitation, the customer reviews that require action may be filtered to display those that have been processed by the management system 105 within the previous two weeks (or any pre-determined time frame) and in which the management system 105 has not provided a response, those wherein the customer review has been changed or updated, and any combination thereof. Without limitations, for a given property, the rating of the imported customer review may be displayed, the external source providing the customer review may be displayed, the date in which the external source published the customer review may be displayed, the author of the customer review may be displayed, the one or more categories in which the customer review has been assigned may be displayed, and the indication of whether or not the management system 105 has responded to the customer review. In embodiments, if the management system 105 has responded to the customer review, the time elapsed since the response may be displayed. In embodiments wherein the management system 105 has not responded to the customer review, there may be an indication that no response has been prepared for this customer review. In embodiments, these values and information may be displayed in a convenient format (for example, a sortable and/or filterable table).

In one or more embodiments, each imported and processed customer review may be provided with a button GUI, wherein activation of the button GUI may display the details of the customer review, such as text, in a separate window. In these embodiments, an operator may remove, add, and/or change the selected one or more categories to which the customer review is assigned. In these embodiments, an operator may further respond to the customer review via the management system 105. In embodiments wherein the customer review was provided by Google, there may be a variety of template responses from which to choose in response to the customer review. In these embodiments, an operator may select one of the template responses or generate a custom response for transmission by activating a reply button GUI.

The management system 105 may transmit the response to Google via Google's API, and the response may be published to display the response to the original customer review. In embodiments wherein the customer review was not provided by Google, an operator may be directed to the original customer review at the respective external source (for example, Yelp's webpage for a specific property) to generate a custom response by activating the reply button GUI. When the customer review is initially imported, the management system 105 also records the property identifier associated with it from the external source. In embodiments, the management system 105 may generate the specific URL with the property identifier information that directs an operator to the webpage containing the necessary property and property reviews.

In the previous embodiments, the transmission and/or generation of a response to a customer review may be dependent on the operator. In one or more embodiments, the management system 105 may be configured to automatically generate and transmit responses to customer reviews for pre-determined external sources. Without limitations, responses may be generated and transmitted for customer reviews provided by Google, Facebook, Yelp, Apartments.com, and/or any combination thereof. In embodiments, the management system 105 may automatically function to generate and/or transmit a response if specific conditions are met by the customer review. If the imported and processed customer review has a rating scored as a 5 or if it has a rating scored as a 4 and does not comprise text, the management system 105 may generate and transmit a response recognizing that specific customer review as positive. If the imported and processed customer review has a rating scored as any one of a 1 to 3 and does not comprise text, the management system 105 may generate and transmit a response recognizing that specific customer review as negative. In embodiments, each automatically generated response may comprise a specific template of text dependent on whether the management system 105 has recognized that the customer review was either positive or negative.

In further embodiments, an operator may select one or more of the displayed customer reviews on this one of the plurality of user interfaces 100 to be transmitted to a second operator. In embodiments, the second operator may manage a specific property, one or more properties, and any combination thereof. In embodiments, the operator may be prompted to designate the second operator to whom the customer review is to be transmitted and/or provide the email address of the second operator to whom the customer review is to be transmitted. With regards to the present disclosure, the management system 105 may transmit the selected one or more customer reviews to the second operator over any suitable network.

In one or more embodiments, the management system 105 may import work orders generated at individual properties to be viewed on a singular platform on one of the plurality of user interfaces 100. In embodiments, an operator may create a work order on a webpage. Once the work order has been submitted on the webpage, the management system 105 may receive the data and record it internally via the system's API. In embodiments, the work order may be recorded and displayed as an email. An operator may view the email and convert it to a trackable work order once verified. In certain embodiments, the data submitted as a work order may not be actionable, and a trackable work order may not be necessary. In embodiments, the conversion to a trackable work order may occur by assigning the trackable work order a unique ticket number. In these embodiments, an operator has the option to send the trackable work order to other operators to manage.

In embodiments, the management system 105 may be configured to perform these importation functions for the work orders at a pre-determined frequency. The pre-determined frequency may be from about once every hour to once every day. Without limitations, the importing functions may be performed once every 6 hours, once every 12 hours, or once every 24 hours. One of ordinary skill in the art will recognize that the management system 105 is not limited to these frequencies, and the pre-determined frequency may be faster or slower. In embodiments, a separate one of the plurality of user interfaces 100 may display work orders assigned as ticket numbers. In this embodiment, the separate one of the plurality of user interfaces 100 may display the work orders as either being in progress or completed. In embodiments, if the work orders have been converted with a ticket number and there has been no further update on that specific ticket number via an email, that work order may be designated as newly submitted.

The management system 105 may change the status of the work order to "in progress" if the management system 105 imports any email containing the unique ticket number. Further, an operator has the capacity to manually change the status to completed. There may further be a filter configured to inhibit the display of read messages regarding a specific work order when actuated. Without limitations, for a given work order, the date the work order was generated may be displayed, the assigned ticket number to the work order may be displayed, the property where the work order is to be completed may be displayed, the classification of the operator whom submitted the work order (for example, a tenant or an employee) may be displayed, the unit number at the property where the work order is to be completed may be displayed, the name of the submitter of the work order may be displayed, and the history of any communications regarding the work order may be displayed. In embodiments, these values and information may be displayed in a convenient format (for example, a sortable and/or filterable table).

In one or more embodiments, each imported work order may be provided with a button GUI, wherein activation of the button GUI may display the details of the work order, such as text, in a separate window. In these embodiments, an operator may delete the ticket, mark the ticket as completed, send an email regarding this work order, and any combination thereof through the use of a plurality of button GUIs displayed near a top portion of the separate window. In embodiments, this separate window may be configured to display all emails sent regarding the work order as a singular email chain or thread. In embodiments wherein an operator has designated to send an email by actuating one of the plurality of button GUIs, a separate window may appear in which the operator may be prompted to write the email.

In embodiments, the separate window may provide the operator with the ability to write an email to the original submitter of the work order, to other pre-determined operators that may be selected to receive the email, and a combination thereof. In embodiments, the operator may transmit the email to the original submitter and/or other pre-determined operators through the management system 105. There may be a separate application and/or database that contains a list of who the pre-determined operators are and relevant information, wherein the management system 105 may obtain such information through its API.

In one or more embodiments, the management system 105 may import emails transmitted to a specific email address. In embodiments, the management system 105 may be configured to perform these importation functions for the emails at a pre-determined frequency. The pre-determined frequency may be from about once every hour to once every day. Without limitations, the importing functions may be performed once every 6 hours, once every 12 hours, or once every 24 hours. One of ordinary skill in the art will recognize that the management system 105 is not limited to these frequencies, and the pre-determined frequency may be faster or slower. In embodiments, there may be a scheduled job working in a server stored on the cloud that may utilize the gmail API to access an inbox and display and/or manage the emails present within the inbox with the management system 105. The scheduled job may compare the date of the last received email and instruct the gmail API to the import any emails received after that date in that inbox. In embodiments, the scheduled job may not require user input or produce an output. During operations, once an email is accessed by the gmail API and imported, the email is parsed to determine whether the email contains a ticket number. In embodiments where there is a ticket number present, the management system 105 may update the status of that specific ticket number.

In embodiments, a separate one of the plurality of user interfaces 100 may display the imported emails. There may be a filter configured to inhibit the display of imported emails that have been viewed or opened when actuated. Without limitations, for a given imported email, the date the email was generated may be displayed, the property that is subject to the email may be displayed, the classification of the operator whom transmitted the email (for example, a tenant or an employee) may be displayed, the unit number of the property subject to the email may be displayed if applicable, the name of the transmitter of the email may be displayed, and the contact information of the transmitter may be displayed. In embodiments, these values and information may be displayed in a convenient format (for example, a sortable and/or filterable table).

In one or more embodiments, each imported email may be provided with a button GUI, wherein activation of the button GUI may display the details of the email, such as text, in a separate window. In these embodiments, an operator may delete the email or create a work order from the email through the use of a plurality of button GUIs displayed near a bottom portion of the separate window. In embodiments, this separate window may be configured to display the information of the transmitter of the email and the body of the text of the email. In embodiments, there may further be a button GUI to close the separate window, which may designate that the email has been viewed.

On the separate one of the plurality of user interfaces 100, this imported email may not be displayed when the filter is actuated as the imported email has been viewed. In embodiments wherein an operator has designated to create a work order from the email by actuating one of the plurality of button GUIs, a separate window may appear in which the operator may be prompted to write an email communicating that a work order has been generated from the original email. In embodiments, the separate window may provide the operator with the ability to write an email to the original transmitter of the email, to other pre-determined operators that may be selected to receive the email, and a combination thereof. In embodiments, the generated work order may be displayed on the previously disclosed one of the plurality of user interfaces 100 displaying the imported work orders.

In one or more embodiments, the management system 105 may generate internal reports based on the imported and processed customer reviews, the imported emails, the imported work orders, and any combinations thereof. In embodiments, a separate one of the plurality of user interfaces 100 may display the available reports that can be downloaded. Without limitations, the operator may download an internal report that has been generated by the management system 105 that contains information and statistics regarding the categories into which the customer reviews had been processed, the customer reviews that have not been replied to with a response, the average rating by month and by external source of each property, the comparison between the current average ratings and those of a previous date, and the customer reviews that had been replied to with a response.

Without limitations, the internal report may further comprise information and statistics regarding the imported work orders, such as number of total tickets assigned, number of completed work orders, and number of work orders replied to and/or replied after a specific period of time. In embodiments, these values and information may be displayed in a convenient format (for example, a sortable and/or filterable table). In embodiments, the management system 105 may be configured to generate internal reports at a pre-determined frequency. The pre-determined frequency may be from about once every hour to once every day. Without limitations, the generating functions may be performed once every 6 hours, once every 12 hours, or once every 24 hours. One of ordinary skill in the art will recognize that the management system 105 is not limited to these frequencies, and the pre-determined frequency may be faster or slower.

In one or more embodiments, each listing of an available internal report may be provided with a button GUI, wherein activation of the button GUI may download that report as an excel file. In other embodiments, the internal report may be downloaded as any other suitable file type. In one or more embodiments, a filter may be applied to download a report for statistics and information between two specific dates. In embodiments, report definitions (for example, queries) may be saved in a structured query language (SQL) format in the management system 105. There may be an absence of user input to create or modify these reports, where it is only performed automatically via the management system 105. In embodiments, the internal reports may have parameters such as date, text, drop down, etc., wherein these parameters are defined in the management system 105. If the internal report has any parameters, a report download screen may ask an operator to select/enter the required parameter value. In embodiments, when the operator clicks to download the internal report, data may be created on-the-fly by running the saved query against the management system 105.

In other embodiments, the management system 105 may further generate and transmit secondary internal reports automatically at a pre-determined frequency dependent on the position of the receiving party and/or operator. In embodiments, each operator of the management system 105 may be assigned or designated a specific role, wherein each role may have access to certain functions within the management system 105. In one or more embodiments, one of the roles may provide the operator with read-only permission, write-only permission, and combinations thereof, of the data and information present on the management system 105. In other embodiments, one of the roles may provide the operator with execution permission, wherein the operator may execute a file and/or function. In embodiments, the automatically generated and transmitted secondary internal reports may be customized based on the type of operator. For example and without limitations, an operator may be an executive-level employee, a mid-level employee (for example, a regional property manager), or a lower-level employee (for example, a property manager for a specific property). This information may be readily available to the management system 105 in addition to the role the operator is assigned. In embodiments, the role may be dependent on which type of employee the operator is.

For example, an operator that is a lower-level employee may be assigned with read-only permission while an operator that is an executive-level employee may be assigned with read and write permission. In one or more embodiments, the secondary internal reports may be generated and transmitted automatically at any pre-determined frequency. Without limitations, the pre-determined frequency may be weekly, bi-weekly, monthly, or quarterly. One of ordinary skill in the art will recognize that the management system 105 is not limited to these frequencies, and the pre-determined frequency may be faster or slower. In these embodiments, the lower-level employee operators may receive these automatic secondary internal reports more frequently than the mid-level and/or executive level employee operators. In embodiments, the secondary internal reports may be different than the downloadable ones previously described. The secondary internal reports may be embedded and have a limited configuration, wherein the configuration can only be done through the management system 105. Without limitations, the data included in each secondary internal report may include customer reviews, an overview, ticket numbers, and any combination thereof. Without limitations, the frequency of generation and transmission of each secondary internal report may be daily, weekly, bi-weekly, or monthly. In embodiments, the recipients of each secondary internal report may be the same as those pre-designated options regarding the email transmitting function as described above.

Although the disclosure and its advantages have been described in detail, it should be understood that various changes, substitutions and alterations can be made herein without departing from the spirit and scope of the disclosure as defined by the following claims.

What is claimed is:

1. A method, comprising:
receiving a plurality of customer reviews from at least one external source via a processor, wherein receiving the plurality of customer reviews comprises:
transmitting a functional call at a pre-determined frequency with property identifiers to an application programming interface (API), wherein the API generates a listing of uniform resource locators associated with the property identifiers; and
instructing the API to send a request to a webpage associated with each one of the uniform resource locators for retrieval of review information, wherein a record is created from the retrieved review information to be stored in an internal database as one of the received plurality of customer reviews;
categorizing, by the processor, each one of the received plurality of customer reviews into a designated one or more categories;
displaying, by the processor, each of the received plurality of customer reviews through one or more widgets on a user interface of a management system;
generating a response to one of the received plurality of customer reviews; and
transmitting the generated response to the at least one external source.

2. The method of claim 1, further comprising receiving the plurality of customer reviews by web scraping the plurality of customer reviews directly from the webpage.

3. The method of claim 1, wherein the API is associated with a singular external source, the method further comprising communicating with a plurality of APIs to receive the plurality of customer reviews from a plurality of external sources.

4. The method of claim 1, wherein each of the received plurality of customer reviews comprises text, the method further comprising categorizing each one of the received plurality of customer reviews based on the subject matter present within the text.

5. The method of claim 1, wherein each of the received plurality of customer reviews comprises a numerical value, the method further comprising determining an average rating provided by the at least one external source based on the numerical value of each of the received plurality of customer reviews.

6. The method of claim 5, further comprising displaying the average rating through the one or more widgets.

7. A non-transitory computer-readable medium storing one or more instructions that, when executed by at least one processor that includes hardware configured to execute the one or more instructions, cause the at least one processor to perform one or more operations comprising:
receive a plurality of customer reviews from at least one external source, wherein receiving the plurality of customer reviews comprises:
transmitting a functional call at a pre-determined frequency with property identifiers to an application programming interface (API), wherein the API generates a listing of uniform resource locators associated with the property identifiers; and
instructing the API to send a request to a webpage associated with each one of the uniform resource locators for retrieval of review information, wherein a record is created from the retrieved review information to be stored in an internal database as one of the received plurality of customer reviews;
categorize each one of the received plurality of customer reviews into a designated one or more categories;
display the received plurality of customer reviews through one or more widgets on a user interface of a management system;
generate a response to one of the received plurality of customer reviews; and
transmit the generated response to the at least one external source.

8. The non-transitory computer-readable medium of claim 7, wherein the instructions further cause the processor to receive the plurality of customer reviews by web scraping the plurality of customer reviews directly from the webpage.

9. The non-transitory computer-readable medium of claim 7, wherein the API is associated with a singular external source, wherein the instructions further cause the processor to communicate with a plurality of APIs to receive the plurality of customer reviews from a plurality of external sources.

10. The non-transitory computer-readable medium of claim 7, wherein each of the received plurality of customer reviews comprises text, wherein the instructions further cause the processor to categorize each one of the received plurality of customer reviews based on the subject matter present within the text.

11. The non-transitory computer-readable medium of claim 7, wherein each of the received plurality of customer reviews comprises a numerical value, wherein the instructions further cause the processor to determine an average rating provided by the at least one external source based on the numerical value of each of the received plurality of customer reviews.

12. The non-transitory computer-readable medium of claim 11, wherein the instructions further cause the processor to display the average rating through the one or more widgets.

13. An apparatus for accessing a management system, comprising:
a memory operable to store a plurality of customer reviews received from at least one external source; and
a processor, operably coupled to the memory, configured to:
receive the plurality of customer reviews, wherein receiving the plurality of customer reviews comprises:
transmitting a functional call at a pre-determined frequency with property identifiers to an application programming interface (API), wherein the API generates a listing of uniform resource locators associated with the property identifiers; and
instructing the API to send a request to a webpage associated with each one of the uniform resource locators for retrieval of review information, wherein a record is created from the retrieved review information to be stored in an internal database as one of the received plurality of customer reviews;
categorize each one of the received plurality of customer reviews into a designated one or more categories;
display each of the received plurality of customer reviews through one or more widgets on a user interface of the management system;
generate a response to one of the received plurality of customer reviews; and
transmit the generated response to the at least one external source.

14. The apparatus of claim 13, wherein the processor is further configured to receive the plurality of customer reviews by web scraping the plurality of customer reviews directly from the webpage.

15. The apparatus of claim 13, wherein the API is associated with a singular external source, wherein the processor is further configured to communicate with a plurality of APIs to receive the plurality of customer reviews from a plurality of external sources.

16. The apparatus of claim 13, wherein each of the received plurality of customer reviews comprises text, wherein the processor is configured to categorize each one of the received plurality of customer reviews based on the subject matter present within the text.

17. The apparatus of claim 13, wherein each of the received plurality of customer reviews comprises a numerical value, wherein the processor is further configured to determine an average rating provided by the at least one external source based on the numerical value of each of the received plurality of customer reviews.

18. The apparatus of claim 17, wherein the processor is further configured to display the average rating through the one or more widgets.

* * * * *